United States Patent Office 3,378,575
Patented Apr. 16, 1968

3,378,575
PROCESS FOR MAKING CYCLOTETRA-
SILOXANETETROL
John F. Brown, Jr., Schenectady, N.Y., assignor to General Electric Company, a corporation of New York
No Drawing. Filed July 29, 1964, Ser. No. 386,050
4 Claims. (Cl. 260—448.2)

ABSTRACT OF THE DISCLOSURE

Tetrahydrocyclotetrasiloxanes containing four phenyl groups or four cyclohexyl groups attached to each silicon atom of the cyclotetrasiloxane, are produced by dissolving a phenyltrihalosilane or cyclohexyltrihalosilane in an aprotic water-soluble solvent and adding this mixture to a mixture of ice and water maintained at a temperature of from $-10°$ to $30°$ C. These hydroxy-containing cyclotetrasiloxanes prevent the bodying of silica-filled silicone rubber prior to peroxide curing of these rubbers.

---

This invention is concerned with novel, cyclic polysiloxanes. More particularly, the invention relates to chemical compositions having the general formula I
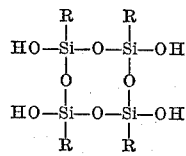

where R is a member of the class consisting of the cyclohexyl radical and the phenyl radical. The above cyclotetrasiloxanetetrols are advantageously prepared by dissolving a halosilane of the formula $RSiX_3$ where R has the meaning above and X is a halogen, e.g., chlorine, bromine, etc., for instance, phenyltrichlorosilane or cyclohexyltrichlorosilane, in an aprotic water-soluble solvent, e.g., acetone, dimethyl sulfoxide, dioxane, tetrahydrofuran, the dimethyl ether of ethylene glycol, etc., and thereafter adding the solution to an ice-water mixture. After allowing the hydrolysis product to remain for about 1-24 hours or more at a temperature of from about $-10°$ to $40°$ C., the solid crystalline material which deposits is readily removed and can be recrystallized by dissolving it first in acetone, and thereafter adding a non-solvent for the tetrol compound, such as benzene, to effect deposition of the tetracyclohexylcyclotetrasiloxanetetrol or tetraphenylcyclotetrasiloxanetetrol of Formula I.

The above cyclotetrasiloxanetetrols have many uses. Because of the multi-functionality as a result of the presence of the silicon-bonded hydroxyl groups, these compositions can be heated, preferably in the presence of dehydrating agents such as ethyl borate or a drier such as metallic salts of organic carboxylic acids (e.g., iron octoate, etc.) at temperatures of about $150-250°$ C. to effect conversion of the cyclotetrasiloxanetetrol to the infusible and insoluble state. Prior to conversion to the thermoset state, resins derived from partially condensing the tetrols can be dissolved in various solvents to form solutions which in turn can be used to coat electrical conductors, and the coated conductor thereafter subjected to temperatures of $150-250°$ C. to effect conversion of the resin to the cured state to yield insulations on the conductors which are heat-resistant and are resistant to extremes in moisture. Additionally, the aforesaid resin solutions can be used to coat sheet material, such as glass cloth, asbestos cloth, etc., which after superposing piles of these materials, they can be pressed at elevated temperatures and pressures to make heat-resistant, laminated panels. The use of these tetrols to render surfaces such as concrete water-repellent is not precluded.

One important use for the above cyclotetrasiloxanetetrols is as an additive in a silicone rubber of the formula

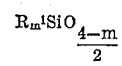

where R' is a monovalent organic radical, e.g., methyl, ethyl, phenyl, vinyl etc., and $m$ is a number from 1.9 to 2.1, inclusive, to prevent formation of "nerve" or "structure" in the rubber as a result of the presence of a reinforcing filler such as fume silica, precipitated silica, silica aerogel, etc. The use of hydroxyl-containing silanes and polysiloxanes for use in reducing structure in silicone rubber in the presence of a reinforcing filler is more particularly disclosed in U.S. Patent 2,890,188, Konkle et al. For the purpose of reducing structure, one can employ from about 0.1 to 10 percent, by weight, of the cyclotetrasiloxanetetrol, based on the weight of the silicone gum. The silicone gum used can be, e.g., a polydimethylsiloxane or one containing up to 0.5 mol percent siliconbonded vinyl groups. The incorporation of the cyclotetrasiloxanetetrol in such filled silicone gums results in a greater stability of the filled compound, as contrasted to the attainment in a matter of a few hours of a highly structured compound when the hydroxyl polyisiloxane is omitted.

In order that those skilled in the art may better understand how the present invention may be practiced, the following examples are given by way of illustration and not by way of limitation.

Example 1

13.2 grams of phenyltrichlorosilane were dissolved in 90 ml. acetone and the solution (cooled to $0°$ C.) was poured into 900 ml. of an equal weight mixture of ice and water. The mixture of ingredients was allowed to stand at a temperature of about $0°$ C. for about 120 hours, during which time a large number of needle-like crystals precipitated. These crystals were filtered off, dried, rinsed with carbon disulfide to remove some residual resin (that is, higher molecular weight condensation products) from the crystals. As a result of this, there was obtained in a 43% yield the compound 2,4,6,8, - tetraphenylcyclotetrasiloxanetetrol of the formula

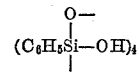

melting at $173-176°$ C. with decomposition. Analysis of the compound showed it to contain 51.9% carbon, 4.5% hydrogen, and to have a molecular weight (ebullioscopic in acetone) of $538\pm5\%$. The theoretical values for this compound are carbon: 52.1%; hydrogen: 4.4%; molecular weight 552. An infrared spectrum of the compound showed a single Si—O—Si asymmetrical stretching band at 1102 cm.$^{-1}$ (in 10% acetone–90% $CS_2$), which is the expected position for a hydroxyl-substituted cyclotetrasiloxane, along with strong SiOH absorptions at 3390 and 913 cm.$^{-1}$.

Example 2

In this example, 2.8 ml. cyclohexyltrichlorosilane was dissolved in 80 ml. acetone and the solution was poured into 20 ml. cold water maintained at a temperature of about $20°$ C. After standing at about room temperature ($25-30°$ C.) for about 4 days, the supernatant solution was decanted, and the desired product precipitated by the addition of 800 ml. water. The dried precipitate was dissolved in cyclohexane, and the solution allowed to stand until a precipitate of crystals was obtained. Recrystallization from hot acetone yielded the compound 2,4,6,8 - tetracyclohexylcyclotetrasiloxanetetrol as long needles melting at 187–193° C. Analysis of the compound showed it to contain 50.0% carbon and 8.4% hydrogen, as contrasted to the theoretical values for the compound of 49.5% carbon and 8.4% hydrogen.

The above-described cyclotetrasiloxanetetrols can be interacted with other organosilicon compositions to obtain copolymeric products. Thus, the aforesaid tetrols can be reacted with diorganodihalogenosilanes of the formula $R_2'SiX_2$ where R' is a monovalent hydrocarbon radical and X is a halogen, such as dimethyldichlorosilane, diphenyldichlorosilane, diethyldichlorosilane, dibutyldibromosilane, ditolyldichlorosilane, etc., in solvents such as diethyl ether, dioxane, etc., under anhydrous conditions employing a hydrohalide acceptor such as pyridine, triethylamine, etc., to remove the hydrogen halide formed.

The following examples illustrate the preparation of coreaction products from the aforesaid cyclotetrasiloxanetetrols.

Example 3

About 1.38 grams 2,4,6,8 - tetraphenylcyclotetrasiloxanetetrol was dissolved in 60 ml. dry ether and to the solution was added about 0.61 ml. dimethyldichlorosilane together with 0.81 ml. pyridine. There was an immediate precipitate of pyridine hydrochloride which was removed by filtration and the filtrate washed with water and evaporated to a syrupy fluid. About 3 ml. ethanol was added and the mixture allowed to stand at about 10° C. for about 18 hours which gave a crystalline material, which when removed and recrystallized twice from an equal weight mixture of benzene and ethanol, yielded the compound 3,3,9,9,15,15,21,21 - octamethyl - 1,5,7,11,-13,17,19,23 - octaphenylpentacyclo[15.7.1.1$^{5,13}$.1$^{7,11}$.1$^{19,23}$] dodecasiloxane melting at 267–270° C. Analyses for this compound showed it to be the above material as evidenced by the fact that it contained: 51.2% carbon; 5.2% hydrogen and had a molecular weight as measured osmometrically in benzene of 1315±10% as contrasted to theoretical values of 50.6% carbon; 4.9% hydrogen; and a molecular weight of 1338. From the remaining liquid there was also isolated by dilution of the latter with cyclohexane, and allowing the solution to remain for about 10 days at 8° C., an additional crystalline product melting at 228–229° C., which was cis - syn - cis - 5,5,-11,11 - tetramethyl - 1,3,7,9 - tetraphenyltricyclo[7.3.1.-1$^{3.7}$]hexasiloxane.

Example 4

About 1.38 grams of the tetraphenylcyclotetrasiloxanetetrol of Example 1 was mixed with 0.61 ml. dimethyldichlorosilane in 50 ml. dry nitromethane. The mixture was warmed for about 30 minutes at a temperature of 80–90° C. and after cooling, the solution was diluted with water to precipitate a crystalline solid. This solid when recrystallized from a benzene-ethanol mixture melted at 420–428° C. and was identified as 5,5,11,11,17,17,23,23-octamethyl - 1,3,7,9,13,15,19,21 - octaphenylpentacyclo[13.9.1.1$^{3,13}$.1$^{7,21}$.1$^{9,19}$]dodecasiloxane.

Example 5

About 1.38 grams of the cyclotetrasiloxanetetrol of Example 1 and 0.81 ml. pyridine were dissolved in 50 ml. dry diethyl ether. To this solution was added 1.03 ml of 1,3 - dichlorotetramethyldisiloxane. After about ½ hour the pyridine hydrochloride which formed was removed by filtration and the ethereal solution washed with water, evaporated to a syrupy mixture, diluted with 3 ml. ethanol and cooled to −25° C. This gave a yield of crystals which when isolated and recrystallized from ethanol were obtained in the form of lozenge-shaped crystals melting sharply at 124° C. This product was identified as cis-syn - cis - 5,5,7,7,13,13,15,15 - octamethyl - 1,3,9,11-tetraphenyltricyclo[9.5.1]octasiloxane as evidenced by analyses which showed the material contained 47.4% carbon; 5.4% hydrogen; and a molecular weight of 817±5% as contrasted to theoretical values of 47.8% carbon; 5.5% hydrogen; and a molecular weight of 812.

Example 6

This example illustrates the use of the cyclotetrasiloxanetetrols as emulsifying agents. More particularly, a 1% solution of the cyclotetrasiloxanetetrol of Example 1 in diethyl ether was shaken with an equal volume of water. It was observed that phase separation after this shaking required several times as long as in a control conducted where the tetrol was omitted from the ether layer. The emulsifying activity presumably results from the ability of the tetrol to form stable monomolecular films at a water interface.

Example 7

This example shows the ability to convert the cyclotetrasiloxanetetrols to resins. More particularly, the cyclotetrasiloxanetetrol of Example 1 was heated at a temperature of about 150° C. to convert the latter to a crosslinked, infusible, insoluble resin.

What I claim as new and desire to secure by Letters Patent of the United States is:

1. The process for making tetrol compositions having the general formula

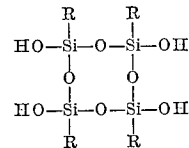

which process comprises dissolving in an aprotic water-soluble solvent a halosilane of the formula $RSiX_3$ where R is a member selected from the class consisting of cyclohexyl and phenyl radicals and X is a halogen, combining the solution with a mixture of ice and water maintained at a temperature of from −10 to 30° C., and thereafter isolating the aforesaid tetrol.

2. The process as in claim 1 in which the halosilane is phenyltrichlorosilane.

3. The process as in claim 1 in which the halosilane is cyclohexyltrichlorosilane.

4. A process as in claim 1 wherein the solvent is acetone.

References Cited

UNITED STATES PATENTS

| | | | |
|---|---|---|---|
| 2,890,188 | 6/1959 | Konkle et al. | 260—37 |
| 2,899,453 | 8/1959 | Spector et al. | 260—448.2 |
| 3,328,448 | 6/1967 | Barnes et al. | 260—448.2 |

MORRIS LIEBMAN, Primary Examiner.

R. BARON, Assistant Examiner.